US012413911B2

(12) United States Patent
Xiao et al.

(10) Patent No.: US 12,413,911 B2
(45) Date of Patent: Sep. 9, 2025

(54) MULTI-FUNCTIONAL SOUND-GENERATING DEVICE

(71) Applicant: AAC Microtech (Changzhou) Co., Ltd., Jiangsu (CN)

(72) Inventors: Bo Xiao, Changzhou (CN); Ronglin Linghu, Changzhou (CN); Lubin Mao, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 160 days.

(21) Appl. No.: 18/536,275

(22) Filed: Dec. 12, 2023

(65) Prior Publication Data

US 2025/0126414 A1 Apr. 17, 2025

Related U.S. Application Data

(63) Continuation of application No. PCT/CN2023/124745, filed on Oct. 16, 2023.

(51) Int. Cl.

| | |
|---|---|
| ***H04R 9/06*** | (2006.01) |
| ***H04R 1/02*** | (2006.01) |
| ***H04R 7/04*** | (2006.01) |
| ***H04R 7/18*** | (2006.01) |
| ***H04R 9/02*** | (2006.01) |
| ***H04R 9/04*** | (2006.01) |

(52) U.S. Cl.

CPC ............... *H04R 9/06* (2013.01); *H04R 1/025* (2013.01); *H04R 7/04* (2013.01); *H04R 7/18* (2013.01); *H04R 9/025* (2013.01); *H04R 9/045* (2013.01); *H04R 2400/03* (2013.01); *H04R 2400/11* (2013.01)

(58) Field of Classification Search

None

See application file for complete search history.

(56) References Cited

FOREIGN PATENT DOCUMENTS

CN 217116374 U * 8/2022 ............... H04R 7/04

OTHER PUBLICATIONS

English Language Translation of CN217116374U, pp. 1-5. (Year: 2022).*

* cited by examiner

*Primary Examiner* — Paul W Huber

(74) *Attorney, Agent, or Firm* — Wiersch Law Group

(57) ABSTRACT

A multi-functional sound-generating device, including an enclosure with an accommodating space and a sound outlet, a sound-generating unit in the accommodating space and a motor assembly. The sound-generating unit includes a cone frame fixed to the enclosure, a vibration system and a magnetic circuit system fixed to the cone frame. The magnetic circuit system has a magnetic gap, and can drive the vibration system to vibrate. The motor assembly includes a motor drive unit at periphery of the magnetic circuit system and spaced from the vibration system, and an elastic member fixed to the enclosure and configured to suspend the magnetic circuit system in the accommodating space. The motor drive unit can drive the magnetic circuit system to vibrate, and includes an iron core fixed to the enclosure and spaced from the vibration system and a ring-shaped solenoid fixed to the iron core.

10 Claims, 7 Drawing Sheets

A-A

A-A

B-B

MULTI-FUNCTIONAL SOUND-GENERATING DEVICE

CROSS-REFERENCE TO RELATED APPLICATIONS

This application is a continuation of International Patent Application No. PCT/CN2023/124745, filed on Oct. 16, 2023. The content of the aforementioned application, including any intervening amendments made thereto, is incorporated herein by reference in its entirety.

TECHNICAL FIELD

The present application relates to electro-acoustic conversion, and more particularly to a multi-functional sound-generating device applied to electronic speaker products.

BACKGROUND

The arrival of the era of mobile Internet has greatly promoted the popularization of smart mobile devices, and among the smart mobile devices, mobile phones are undoubtedly the most common and portable mobile terminal devices. Currently, the mobile phones are extremely versatile, integrating the high-quality music playing function and the vibration function, and thus those sound-generating devices having the vibration function and sound-generation function has been extensively employed in the existing smart mobile devices.

In the related technology, the sound-generating device includes an enclosure, a sound-generating unit and a motor vibration system, where the sound-generating unit and the motor vibration system are housed within the enclosure. The sound-generating unit includes a cone frame, a vibration system and a magnetic circuit system having a magnetic gap, where the vibration system and the magnetic circuit system are fixed to the cone frame. The motor vibration system is attached to a side of the magnetic circuit system away from the vibration system.

However, regarding the existing sound-generating devices, the motor vibration system is often stacked below the sound-generating unit, which results in an increase in the overall height of the sound-generating device, thereby leading to an increased cost.

Therefore, it is necessary to provide a multi-functional sound-generating device to solve the above technical problems.

SUMMARY

An object of the present application is to provide a multi-functional sound-generating device with good vibration effect, low cost and excellent acoustic performance.

Technical solutions of this application will be specifically described below.

This application provides a multi-functional sound-generating device, comprising:

an enclosure with an accommodating space; and a sound-generating unit housed within the accommodating space;

wherein the enclosure is provided with a sound outlet running through a side of the enclosure; the sound-generating unit comprises a cone frame fixed to the enclosure, a vibration system and a magnetic circuit system; the vibration system and the magnetic circuit system are both fixed to the cone frame; and the magnetic circuit system has a magnetic gap, and is configured to drive the vibration system to vibrate to produce sound;

the multi-functional sound-generating device further comprises a motor assembly housed in the accommodating space; the motor assembly comprises a motor drive unit and an elastic member; the motor drive unit is provided on a peripheral side of the magnetic circuit system, and is spaced from the vibration system; the elastic member is fixed to the enclosure, and is configured to suspend the magnetic circuit system in the accommodating space; and the motor drive unit is configured to drive the magnetic circuit system to vibrate; and the motor drive unit comprises an iron core and a solenoid; the iron core is fixed to the enclosure, and is spaced from the vibration system; the solenoid is sleevedly fixed to the iron core, and has a ring shape; and the iron core is spacedly provided on the peripheral side of the magnetic circuit system.

In some embodiments, the motor drive unit further comprises a magnet fixed to the enclosure; and the magnet is located at a side of the iron core away from the magnetic circuit system.

In some embodiments, the magnetic circuit system comprises a bottom plate, a first primary magnet stackedly fixed to the bottom plate, a secondary magnet stackedly fixed to the bottom plate, a pole core stackedly fixed to the first primary magnet, a second primary magnet stackedly fixed to the pole core, and a top plate; the secondary magnet is spaced from the first primary magnet to form the magnetic gap; the top plate is stackedly fixed to the secondary magnet, and is fixedly connected to the cone frame; a first end of the elastic member is fixed to the enclosure, and a second end of the elastic member is fixed to a side of the bottom plate; the bottom plate is provided with an avoidance hole running through the bottom plate; the avoidance hole is located at a side of the secondary magnet away from the first primary magnet; the motor drive unit further comprises a magnet fixed to the bottom plate; the magnet is located at a side of the avoidance hole away from the secondary magnet; and the iron core and the solenoid are located in the avoidance hole; and a magnetization direction of the first primary magnet is parallel to a vibration direction of the vibration system; a magnetization direction of the second primary magnet is opposite to the magnetization direction of the first primary magnet; a magnetization direction of the secondary magnet is perpendicular to the magnetization direction of the first primary magnet; and a magnetization direction of the magnet is opposite to the magnetization direction of the secondary magnet.

In some embodiments, the number of the motor drive unit is two, and two motor drive units are arranged opposite to each other at opposite sides of the magnetic circuit system, respectively; and the number of the elastic member is two, and two elastic members are arranged staggeredly at another opposite sides of the magnetic circuit system, respectively.

In some embodiments, the iron core comprises an iron core body and a support table fixed to opposite ends of the iron core body; the support table is fixed to the enclosure; and the solenoid is sleeved on the iron core body.

In some embodiments, the bottom plate comprises a bottom plate body and a connecting plate configured to bend and extend from a short axis side of the bottom plate body toward the vibration system; the second end of the elastic member is fixed to a first side of the connecting plate; and the secondary magnet is arranged at a second side of the connecting plate away from the elastic member.

In some embodiments, the second primary magnet comprises a magnet body and an extending portion; the magnet body is stackedly fixed to the pole core, and the extending portion is configured to protrude and extend from the magnet body toward the vibration system; and the vibration system is stackedly provided at the magnet body, and surrounds the extending portion.

In some embodiments, the vibration system comprises a diaphragm fixed to the cone frame and a voice coil configured to drive the diaphragm to vibrate to produce sound; and the voice coil is inserted in the magnetic gap; and the diaphragm comprises a first surround in a ring shape, a second surround fixed to an inner periphery of the first surround, a third surround in a ring shape and a vibration portion in a ring shape; the third surround is spacedly provided at an inner side of the second surround; the vibration portion is fixedly connected between the second surround and the third surround; an outer periphery of the first surround is fixed to the enclosure; a side of the inner periphery of the first surround close to the magnetic circuit system is fixed to the cone frame; the voice coil is fixed to a side of the vibration portion close to the magnetic circuit system; and an inner periphery of the third surround is sleevedly provided on the extending portion.

In some embodiments, the vibration system further comprises a fixed ring fixed to the inner periphery of the third surround, and a dome; the dome is stackedly fixed to a side of the vibration portion away from the magnetic circuit system; and the fixed ring is configured to spacedly surround the extending portion.

In some embodiments, the vibration system further comprises a skeleton; the skeleton comprises a skeleton body configured to play a role as the vibration portion, a first skeleton connecting portion and a second skeleton connecting portion; the first skeleton connecting portion and the second skeleton connecting portion are configure to extend from a side of the skeleton body close to the magnetic circuit system, and are spaced from each other; the voice coil is fixed to a side of the first skeleton connecting portion close to the magnetic circuit system; and the dome is stackedly fixed to the skeleton body.

Compared to the prior art, this application has the following beneficial effects.

The multi-functional sound-generating device provided herein includes an enclosure having an accommodating space and a sound-generating unit housed in the accommodating space. The enclosure is provided with a sound outlet running through a side of the enclosure. The sound-generating unit includes a cone frame fixed to the enclosure, a vibration system and a magnetic circuit system, where the vibration system and the magnetic circuit system are both fixed to the cone frame, and the magnetic circuit system has a magnetic gap, and is configured to drive the vibration system to vibrate to produce sound. The motor assembly includes a motor drive unit and an elastic member, where the motor drive unit is provided on a peripheral side of the magnetic circuit system, and is spaced from the vibration system; the elastic member is fixed to the enclosure, and is configured to suspend the magnetic circuit system in the accommodating space; and the motor drive unit is configured to drive the magnetic circuit system to vibrate. The motor drive unit includes an iron core and a solenoid, where the iron core is fixed to the enclosure, and is spaced from the vibration system; the solenoid is sleevedly fixed to the iron core, and has a ring shape; and the iron core is spacedly provided on the peripheral side of the magnetic circuit system. By means of the interaction between the magnetic field generated by the iron core and solenoid of the motor drive unit and the magnetic field of the magnetic circuit system, the magnetic circuit system is driven to vibrate back and forth under the action of the elastic member; in this way, a single magnetic circuit system is shared by the vibration-driving system and the motor drive unit, which can effectively reduce the cost of the sound-generating device. Moreover, the motor drive unit is arranged at a side of the magnetic circuit system, which can effectively reduce the total height of the sound-generating device. The sound-generating device provided herein has superior vibration effect and excellent acoustic performance.

BRIEF DESCRIPTION OF THE DRAWINGS

In order to illustrate the technical solutions in the embodiments of the present application more clearly, the drawings needed in the description of embodiments of the present application will be briefly described below. Obviously, presented in the drawings are merely some embodiments of this application, which are not intended to limit this application. For those skilled in the art, other drawings can be obtained based on the drawings provided herein without making creative effort.

DETAILED DESCRIPTION OF THE EMBODIMENTS

Technical solutions of this application will be clearly and completely described below with reference to the embodiments and drawings. Obviously, described below are merely some embodiments of this application, which are not intended to limit this application. It should be understood that all other embodiments obtained by those skilled in the art based on the content disclosed herein without making creative effort shall fall within the scope of this application defined by the appended claims.

Figure 1:
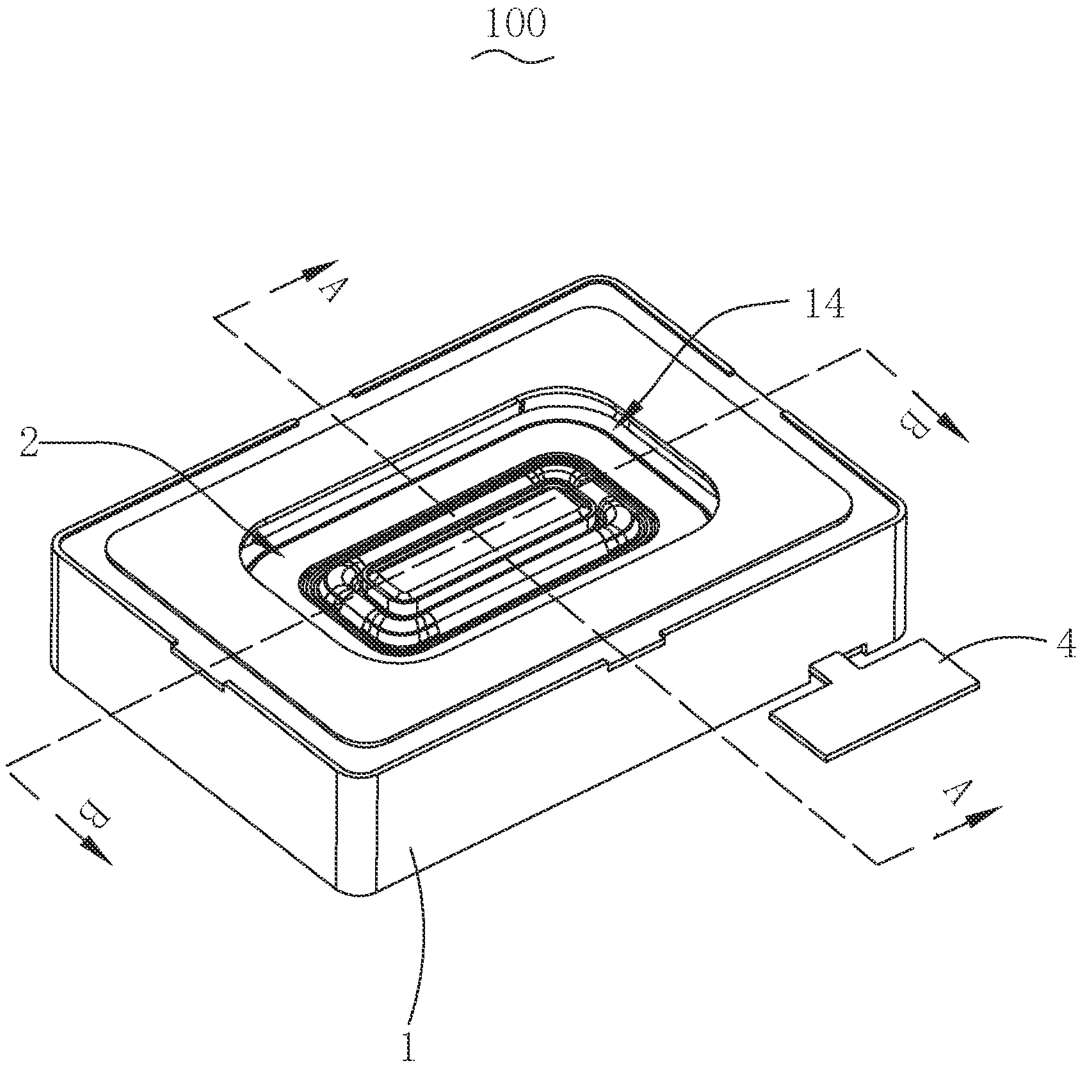
FIG. 1 is a perspective view of a multi-functional sound-generating device according to an embodiment of the present disclosure.
Figure 2:
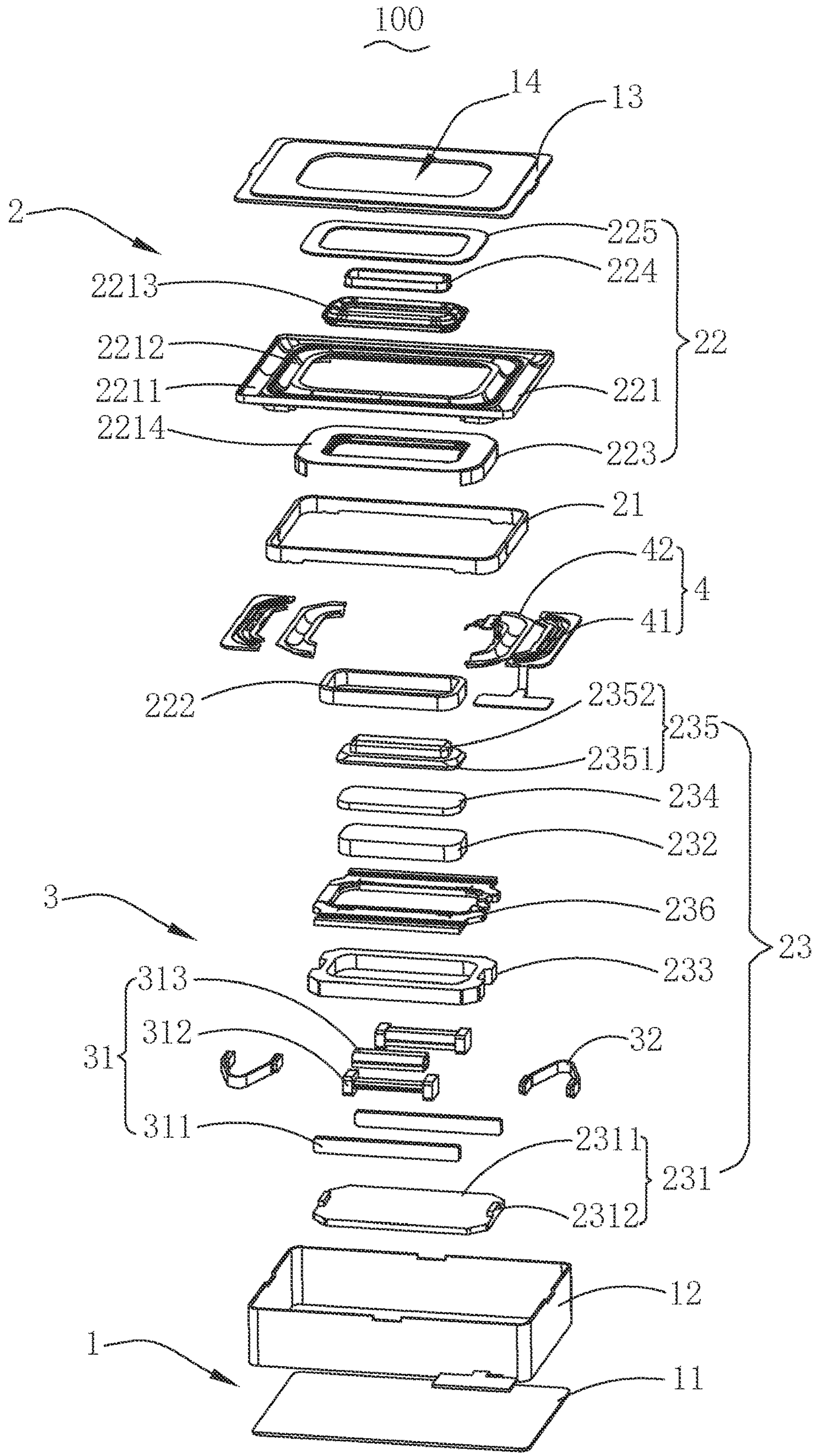
FIG. 2 is an exploded view of the multi-functional sound-generating device according to an embodiment of the present disclosure.
Figure 3:
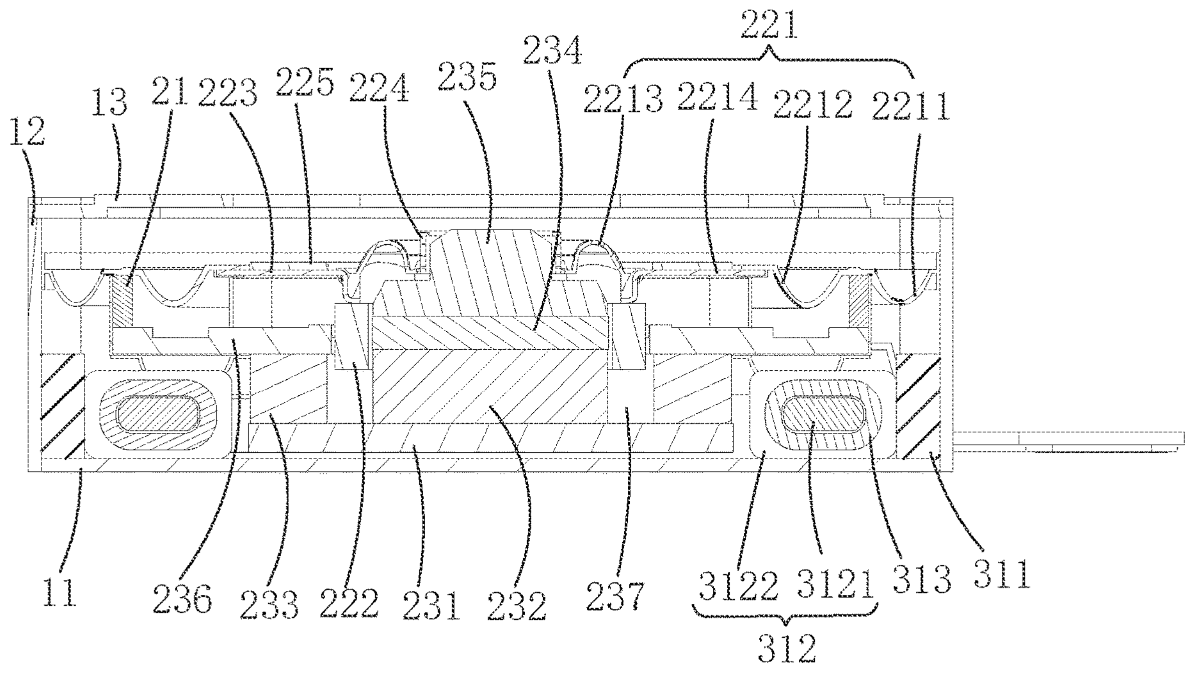
FIG. 3 is a sectional view of the multi-functional sound-generating device in FIG. 1 along A-A line.
Figure 4:
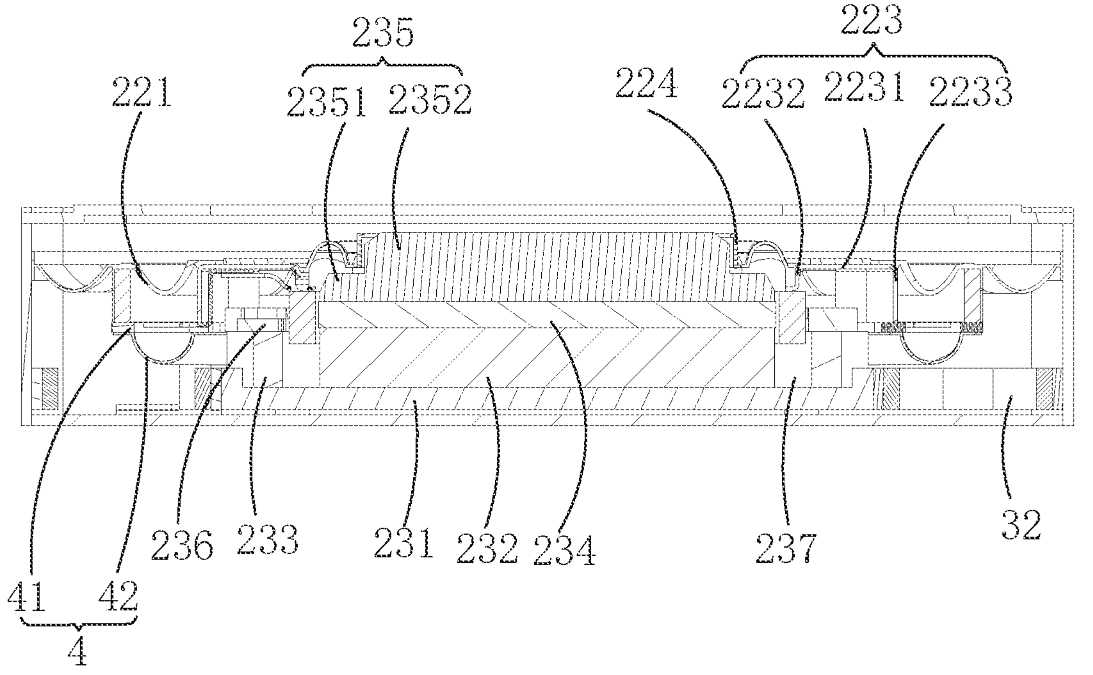
FIG. 4 is a sectional view of the multi-functional sound-generating device in FIG. 1 along B-B line.

Referring to FIGS. 1-4, this application provides a multi-functional sound-generating device 100, including an enclosure 1 having an accommodating space and a sound-generating unit 2 accommodated in the accommodating space. The enclosure 1 is provided with a sound outlet 14 running through a side of the enclosure 1. The sound-generating unit 2 includes a cone frame 21 fixed to the enclosure 1, a vibration system 22 and a magnetic circuit system 23. The vibration system 22 and the magnetic circuit system 23 are both fixed to the cone frame 21. The magnetic circuit system

23 has a magnetic gap 237, and is configured to drive the vibration system 22 to vibrate to produce sound. The multi-functional sound-generating device 100 is configured to produce sound through the sound outlet 14; the enclosure 1 is configured to accommodate and protect the sound-generating unit 2; and the cone frame 21 is configured to fix the vibration system 22 and the magnetic circuit system 23.

The multi-functional sound-generating device 100 further includes a motor assembly 3 accommodated in the accommodating space. The motor assembly 3 includes a motor drive unit 31 and an elastic member 32. The motor drive unit 31 is provided on a peripheral side of the magnetic circuit system 23, and is spaced from the vibration system 22. The elastic member 32 is fixed to the enclosure 1, and is configured to suspend the magnetic circuit system 23 in the accommodating space. The motor drive unit 31 is configured to drive the magnetic circuit system 23 to vibrate. Through the interaction between a magnetic field of the motor drive unit 31 and a magnetic field of the magnetic circuit system 23, the magnetic circuit system 23 is driven to vibrate back and forth within the enclosure 1. In this way, a single magnetic circuit system 23 is shared by the vibration system 22 and the motor drive unit 31, which can effectively reduce the cost of the sound-generating device. Moreover, the motor drive unit 31 is arranged at a side of the magnetic circuit system 23, which can effectively reduce the total height of the sound-generating device.

The motor drive unit 31 includes an iron core 312 and a solenoid 313. The iron core 312 is fixed to the enclosure 1, and is spaced from the vibration system 22. The solenoid 313 is sleevedly fixed to the iron core 312, and has a ring shape. The iron core 312 is spacedly provided on the peripheral side of the magnetic circuit system 23.

In this embodiment, the motor drive unit further includes a magnet 311 fixed to the enclosure 1, and the magnet 311 is located at a side of the iron core 312 away from the magnetic circuit system 23. The magnetic circuit system 23 is suspended in the accommodating space through the elastic member 32, and the iron core 312 is fixed to the enclosure 1. The magnetic circuit system 23 and the magnet 311 together provide a driving force to the solenoid 313 to allow the solenoid 313 to drive the magnetic circuit system 23 to vibrate on the elastic member 32, thereby improving the vibration performance of the motor assembly 3.

Figure 5:
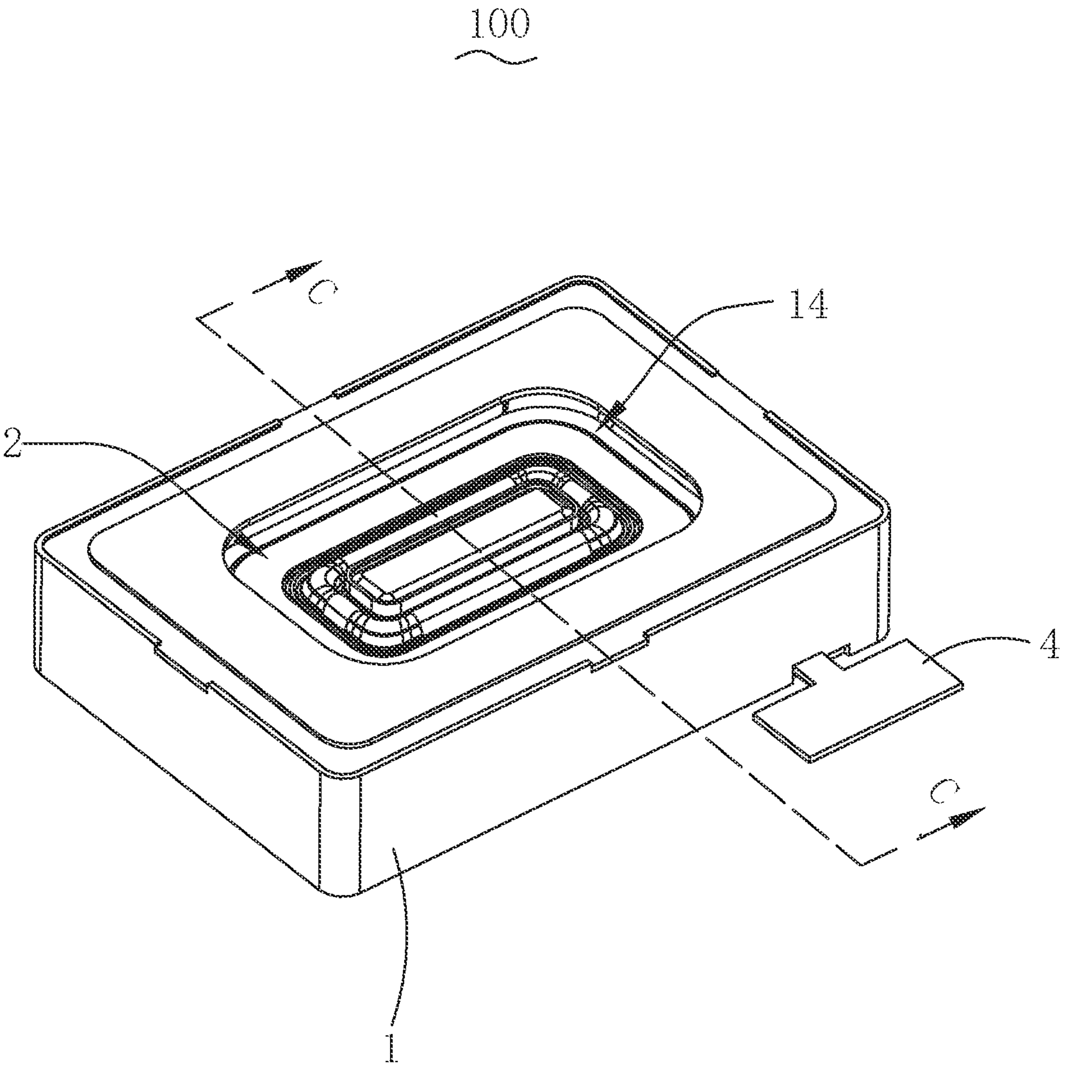
FIG. 5 is a perspective view of a multi-functional sound-generating device according to another embodiment of the present disclosure.
Figure 6:
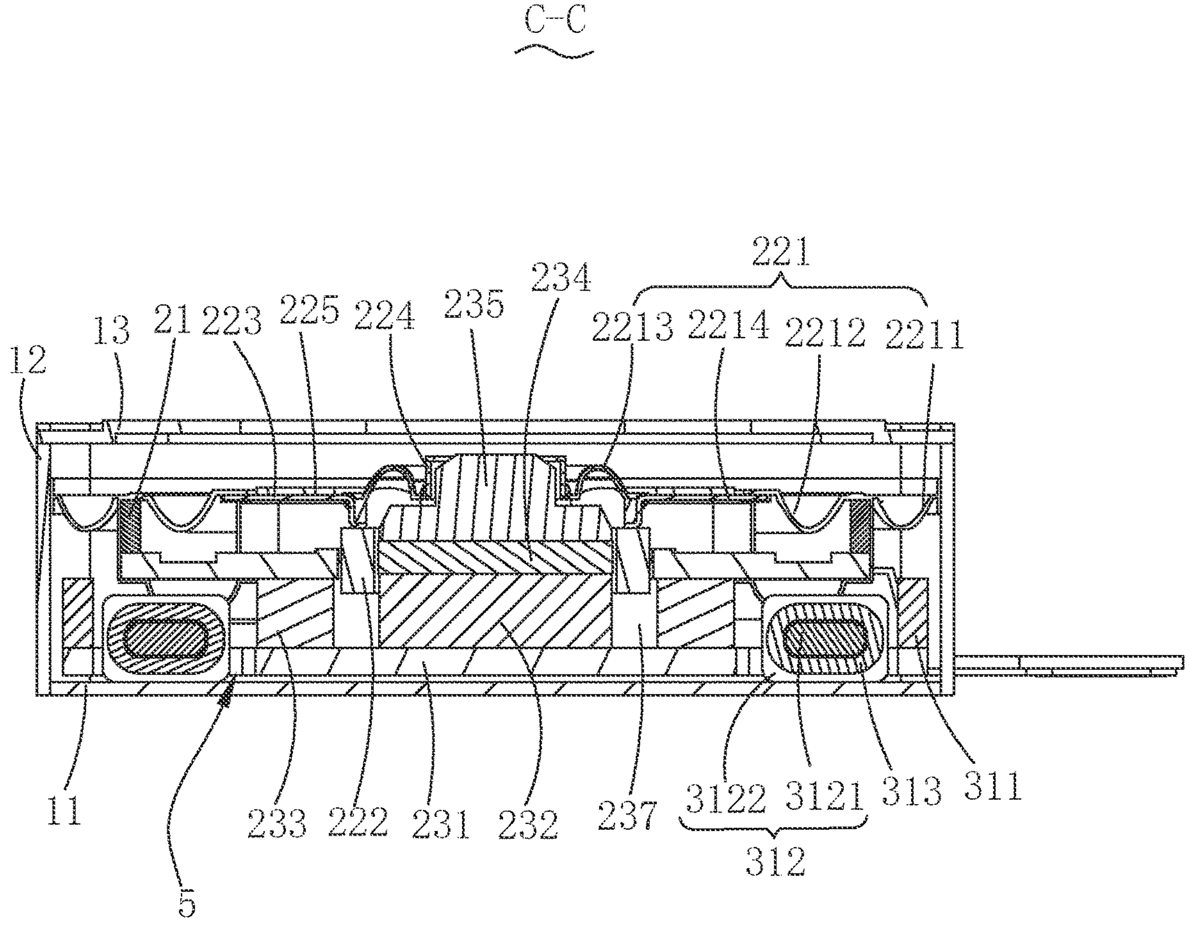
FIG. 6 is a sectional view of the multi-functional sound-generating device in FIG. 5 along C-C line.
Figure 7:
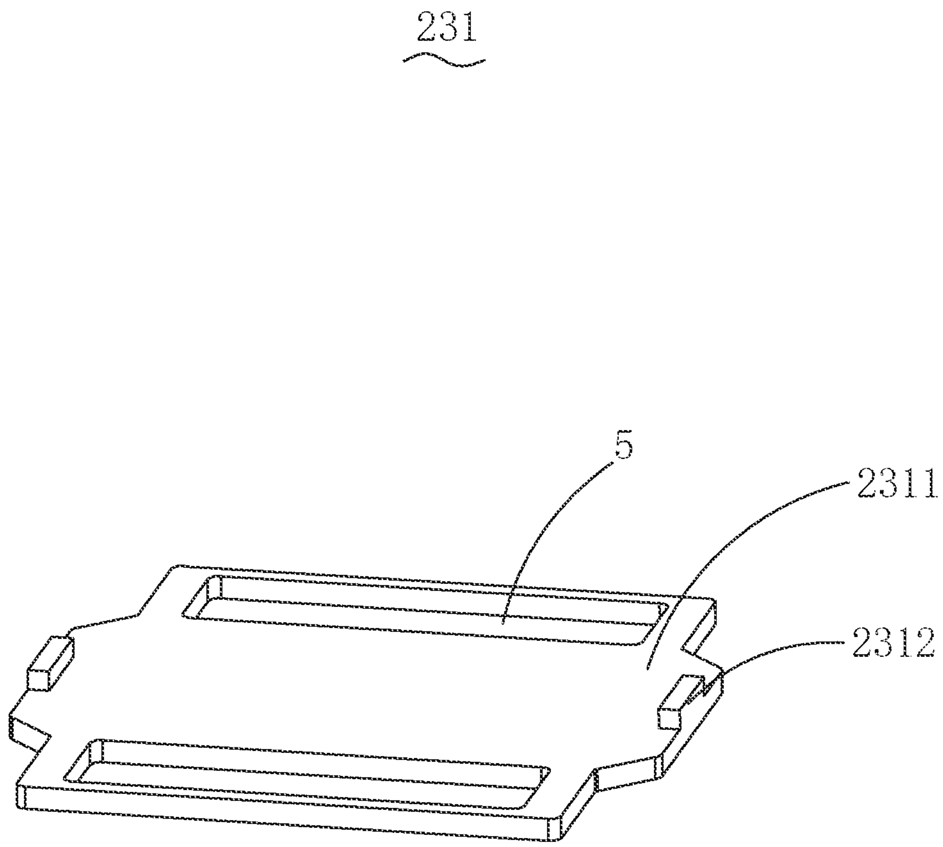
FIG. 7 is a structural diagram of a bottom plate in the multi-functional sound-generating device in FIG. 5.

Referring to FIGS. 1-7, in an optional embodiment, the magnetic circuit system 23 includes a bottom plate 231, a first primary magnet 232 stackedly fixed to the bottom plate 231, secondary magnet 233 stackedly fixed to the bottom plate 231, a pole core 234 stackedly fixed to the first primary magnet 232, a second primary magnet 235 stackedly fixed to the pole core 234, and a top plate 236. The secondary magnet 233 is spaced from the first primary magnet 232 to form the magnetic gap 237. The top plate 236 is stackedly fixed to the secondary magnet 233, and is fixedly connected to the cone frame 21. A first end of the elastic member 32 is fixed to the enclosure 1, and a second end of the elastic member 32 is fixed to a side of the bottom plate 231.

Preferably, the bottom plate 231 is provided with an avoidance hole 5 running therethrough. The avoidance hole 5 is located at a side of the secondary magnet 233 away from the first primary magnet 232. The motor drive unit 31 further includes a magnet 311 fixed to the bottom plate 231. The magnet 311 is located at a side of the avoidance hole 5 away from the secondary magnet 233. The iron core 312 and the solenoid 313 are located in the avoidance hole 5. In this way, the magnet 311 and the bottom plate 231 are fixed into an integral structure, and the iron core 312 is provided in the avoidance hole 5 and is fixedly connected to the enclosure 1, such that the magnetic circuit system 23 and the magnet 311 are stably fixed. More preferably, the avoidance hole 5 is rectangular.

A magnetization direction of the first primary magnet 232 is parallel to a vibration direction of the vibration system 22. A magnetization direction of the second primary magnet 235 is opposite to the magnetization direction of the first primary magnet 232. A magnetization direction of the secondary magnet 233 is perpendicular to the magnetization direction of the first primary magnet 232, and a magnetization direction of the magnet 311 is opposite to the magnetization direction of the secondary magnet 233. The first primary magnet 232 and the second primary magnet 235 are configured to have opposite magnetization directions, so as to drive the vibration system 22 to vibrate to produce sound.

The magnetization direction of the secondary magnet 233 is perpendicular to the magnetization direction of the first primary magnet 232, and the magnetization direction of the magnet 311 is opposite to the magnetization direction of the secondary magnet 233, such that through the interaction between magnetic fields of the magnet 311 and the secondary magnet 233, the sound-generating unit 2 can be driven to vibrate back and forth along a direction perpendicular to the magnetization direction of the first primary magnet 232, thereby improving the vibration performance of the multi-functional sound-generating device 100.

More preferably, the enclosure 1 includes a rectangular hollow frame 12, a bottom shell 11 and a top cover 13, where the bottom shell 11 and the top cover 13 are fixed to opposite sides of the frame 12, respectively. The motor drive unit 31 is fixed to a side of the bottom shell 11 close to the vibration system 22. One end of the elastic member 32 is fixed to a side of the frame 12 close to the magnetic circuit system 23, and the other end of the elastic member 32 is fixed to the magnetic circuit system 23. The bottom shell 11, the frame 12 and the top cover 13 together enclose the accommodating space.

Preferably, the sound-generating unit 2 can also be used as a mass block of the multi-functional sound-generating device 100, and by increasing the overall weight of the sound-generating unit 2, the vibration amplitude of the sound-generating unit 2 can be improved, so as to enable the motor assembly 3 to output a larger acceleration, thereby enhancing the vibration performance of the multi-functional sound-generating device 100.

In this embodiment, the number of the motor drive unit 31 is two, and two motor drive units 31 are arranged opposite to each other at opposite sides of the magnetic circuit system 23, respectively. The number of the elastic member 32 is two, and two elastic members 32 are arranged staggeredly at another opposite sides of the magnetic circuit system 23, respectively.

Specifically, the two motor drive units 31 are arranged opposite to each other at opposite sides along a long axis side of the magnetic circuit system 23, respectively, and the two elastic members 32 are arranged staggeredly at opposite sides along a short axis side of the magnetic circuit system 23, respectively, which can facilitate saving the installation space. Moreover, the arrangement of multiple motor drive units 31 can improve the vibration performance of the sound-generating unit 2. The staggered arrangement of the two elastic members can improve the vibration stability of the sound-generating unit 2, rendering the overall reliability high.

In some embodiments, the elastic member 32 is a V-shaped or U-shaped elastic support. One end of each of the two elastic supports is fixed to the frame 12, and the other end of each of the elastic supports is fixed to the magnetic circuit system 23. Preferably, the two elastic supports are opposite in open direction.

In this embodiment, the iron core 312 includes an iron core body 3121 and a support table 3122 fixed to opposite ends of the iron core body 3121. The support table 3122 is fixed to the enclosure 1. The solenoid 313 is sleeved on the iron core body 3121. The support table 3122 is fixed to the bottom shell 11 of the enclosure 1, so as to support the iron core body 3121. The solenoid 313 is spaced from the bottom shell 11.

In this embodiment, the bottom plate 231 includes a bottom plate body 2311 and a connecting plate 2312 configured to bend and extend from a short axis side of the bottom plate body 2311 toward the vibration system 22. The second end of the elastic member 32 is fixed to a first side of the connecting plate 2312, and the secondary magnet 233 is arranged at a second side of the connecting plate 2312 away from the elastic member 32. Inner sides of the connecting plates 2312 oppositely arranged can limit and fix the secondary magnet 233 placed on the bottom plate body 2311. Meanwhile, an outer side of the connecting plate 2312 is fixedly connected to the second end of the elastic member 32, such that the elastic member 32 can elastically support the bottom plate body 2311, improving the vibration performance of the sound-generating unit 2.

In this embodiment, the second secondary magnet 235 includes a magnet body 2351 and an extending portion 2352. The magnet body 2351 is stackedly fixed to the pole core 234, and the extending portion 2352 is configured to protrude and extend from the magnet body 2351 toward the vibration system 22. The vibration system 22 is stackedly provided at the magnet body 2351, and surrounds the extending portion 2352.

In this embodiment, the vibration system 22 includes a diaphragm 221 fixed to the cone frame 21 and a voice coil 222 configured to drive the diaphragm 221 to vibrate to produce sound, where the voice coil 222 is inserted in the magnetic gap 237.

The diaphragm 221 includes a first surround 2211 in a ring shape, a second surround 2212 fixed to an inner periphery of the first surround 2211, a third surround 2213 in a ring shape and a vibration portion 2214 in a ring shape. The third surround 2213 is spacedly provided at an inner side of the second surround 2212. The vibration portion 2214 is fixedly connected between the second surround 2212 and the third surround 2213. An outer periphery of the first surround 2211 is fixed to the enclosure 1. A side of the inner periphery of the first surround 2211 close to the magnetic circuit system 23 is fixed to the cone frame 21. The voice coil 222 is fixed to a side of the vibration portion 2214 close to the magnetic circuit system 23. An inner periphery of the third surround 2213 is sleevedly provided on the extending portion 2352. By fixing the first surround 2211 and the second surround 2212 to the cone frame 21, fixing the inner periphery of the second surround 2212 and the outer periphery of the third surround 2213 to the vibration portion 2214 and fixing the voice coil 222 to the vibration portion 2214, the fixity and stability of the first surround 2211, second surround 2212 and third surround 2213 are improved, thereby enhancing the structural stability of the diaphragm 221.

In this embodiment, the vibration system 22 further includes a fixed ring 224 fixed to the inner periphery of the third surround 2213, and a dome 225, where the dome 225 is stackedly fixed to a side of the vibration portion 2214 away from the magnetic circuit system 23, and the fixed ring 224 is configured to spacedly surround the extending portion 2352.

In this embodiment, the vibration system 22 further includes a skeleton 223. The skeleton 223 includes a skeleton body 2231 configured to play a role as the vibration portion 2214, a first skeleton connecting portion 2232 and a second skeleton connecting portion 2233. The first skeleton connecting portion 2232 and the second skeleton connecting portion 2233 are configure to extend from a side of the skeleton body 2231 close to the magnetic circuit system 23, and are spaced from each other. The voice coil 222 is fixed to a side of the first skeleton connecting portion 2232 close to the magnetic circuit system 23. The dome 225 is stackedly fixed to the skeleton body 2231.

In this embodiment, the vibration system 22 further includes an elastic support assembly 4, which is fixed to the cone frame 21 and a side of the second skeleton connecting portion 2233 away from the diaphragm 221. The elastic support assembly 4 includes an elastic conductive part 41 and an auxiliary diaphragm 42, where the elastic conductive part 41 is fixed to the cone frame 21, and the auxiliary diaphragm 42 is fixed to a side of the elastic conductive part 41 away from the diaphragm 221.

The number of the elastic support assembly 4 is two, and two elastic support assemblies 4 are fixed to opposite sides along a short axis of the cone frame 21, respectively. The symmetric arrangement of the two elastic support assemblies 4 can support the voice coil 222 more stably, thereby providing excellent vibration reliability. In some embodiments, the two elastic support assemblies 4 are fixed to the cone frame 21 and the skeleton 223, respectively. In one hand, the elastic support assemblies 4 can enhance the vibration effect of the diaphragm 221 to improve the acoustic performance of the multi-functional sound-generating device 100; and on the other hand, the elastic support assemblies 4 can balance the swaying of the vibration system 22 to improve the stability of the multi-functional sound-generating device 100.

More specifically, the voice coil 222 can be electrically connected to an external circuit via the elastic conductive part 41 to realize the independent control of the sound-generating unit 2. On one hand, this structure can improve the vibration strength and balance of the vibration system 22 and inhibit the swaying; on the other hand, the voice coil 222 is led to be connected to an external power supply, avoiding the risk that a lead wire of the voice coil 222 is prone to break when a lead structure of the voice coil 222 is led to the power supply. Moreover, the elastic conductive part 41 can also supply power to the solenoid 313 so as to make the solenoid 313 energized to generate a corresponding magnetic field.

Compared to the related technology, the multi-functional sound-generating device provided herein includes an enclosure having an accommodating space and a sound-generating unit housed in the accommodating space. The enclosure is provided with a sound outlet running through a side of the enclosure. The sound-generating unit includes a cone frame fixed to the enclosure, a vibration system and a magnetic circuit system, where the vibration system and the magnetic circuit system are both fixed to the cone frame, and the magnetic circuit system has a magnetic gap, and is configured to drive the vibration system to vibrate to produce sound. The motor assembly includes a motor drive unit and an elastic member, where the motor drive unit is provided on a peripheral side of the magnetic circuit system, and is spaced from the vibration system; the elastic member is fixed to the enclosure, and is configured to suspend the magnetic circuit system in the accommodating space; and the motor drive unit is configured to drive the magnetic circuit system to vibrate. The motor drive unit includes an iron core and a solenoid, where the iron core is fixed to the enclosure, and is spaced from the vibration system; the solenoid is sleevedly fixed to the iron core, and has a ring shape; and the iron core is spacedly provided on the peripheral side of the magnetic circuit system. By means of the interaction between the magnetic field generated by the iron core and solenoid of the motor drive unit and the magnetic field of the magnetic circuit system, the magnetic circuit system is driven to vibrate back and forth under the action of the elastic member; in this way, a single magnetic circuit system is shared by the vibration-driving system and the motor drive unit, which can effectively reduce the cost of the sound-generating device. Moreover, the motor drive unit is arranged at a side of the magnetic circuit system, which can effectively reduce the total height of the sound-generating device. The sound-generating device provided herein has superior vibration effect and excellent acoustic performance.

The foregoing description of the disclosed embodiments enables those of ordinary skill in the art to implement or use the technical solutions of this application, and is not intended to limit the present application. It should be understood that any variations, replacements and modifications made by those of ordinary skill in the art without departing from the spirit and scope of the present application shall fall within the scope of the present application defined by the appended claims.

What is claimed is:

1. A multi-functional sound-generating device, comprising:
- an enclosure with an accommodating space; and
- a sound-generating unit housed within the accommodating space;
- wherein the enclosure is provided with a sound outlet running through a side of the enclosure; the sound-generating unit comprises a cone frame fixed to the enclosure, a vibration system and a magnetic circuit system; the vibration system and the magnetic circuit system are both fixed to the cone frame; and the magnetic circuit system has a magnetic gap, and is configured to drive the vibration system to vibrate to produce sound;
- the multi-functional sound-generating device further comprises a motor assembly housed in the accommodating space; the motor assembly comprises a motor drive unit and an elastic member; the motor drive unit is provided on a peripheral side of the magnetic circuit system, and is spaced from the vibration system; the elastic member is fixed to the enclosure, and is configured to suspend the magnetic circuit system in the accommodating space; and the motor drive unit is configured to drive the magnetic circuit system to vibrate; and
- the motor drive unit comprises an iron core and a solenoid; the iron core is fixed to the enclosure, and is spaced from the vibration system; the solenoid is sleevedly fixed to the iron core, and has a ring shape; and the iron core is spacedly provided on the peripheral side of the magnetic circuit system.

2. The multi-functional sound-generating device of claim 1, wherein the motor drive unit further comprises a magnet fixed to the enclosure; and the magnet is located at a side of the iron core away from the magnetic circuit system.

3. The multi-functional sound-generating device of claim 1, wherein the magnetic circuit system comprises a bottom plate, a first primary magnet stackedly fixed to the bottom plate, a secondary magnet stackedly fixed to the bottom plate, a pole core stackedly fixed to the first primary magnet, a second primary magnet stackedly fixed to the pole core, and a top plate; the secondary magnet is spaced from the first primary magnet to form the magnetic gap; the top plate is stackedly fixed to the secondary magnet, and is fixedly connected to the cone frame; a first end of the elastic member is fixed to the enclosure, and a second end of the elastic member is fixed to a side of the bottom plate; the bottom plate is provided with an avoidance hole running through the bottom plate; the avoidance hole is located at a side of the secondary magnet away from the first primary magnet; the motor drive unit further comprises a magnet fixed to the bottom plate; the magnet is located at a side of the avoidance hole away from the secondary magnet; and the iron core and the solenoid are located in the avoidance hole; and
- a magnetization direction of the first primary magnet is parallel to a vibration direction of the vibration system; a magnetization direction of the second primary magnet is opposite to the magnetization direction of the first primary magnet; a magnetization direction of the secondary magnet is perpendicular to the magnetization direction of the first primary magnet; and a magnetization direction of the magnet is opposite to the magnetization direction of the secondary magnet.

4. The multi-functional sound-generating device of claim 1, wherein the number of the motor drive unit is two, and two motor drive units are arranged opposite to each other at opposite sides of the magnetic circuit system, respectively; and the number of the elastic member is two, and two elastic members are arranged staggeredly at another opposite sides of the magnetic circuit system, respectively.

5. The multi-functional sound-generating device of claim 1, wherein the iron core comprises an iron core body and a support table fixed to opposite ends of the iron core body; the support table is fixed to the enclosure; and the solenoid is sleeved on the iron core body.

6. The multi-functional sound-generating device of claim 3, wherein the bottom plate comprises a bottom plate body and a connecting plate configured to bend and extend from a short axis side of the bottom plate body toward the vibration system; the second end of the elastic member is fixed to a first side of the connecting plate; and the secondary magnet is arranged at a second side of the connecting plate away from the elastic member.

7. The multi-functional sound-generating device of claim 3, wherein the second primary magnet comprises a magnet body and an extending portion; the magnet body is stackedly fixed to the pole core, and the extending portion is configured to protrude and extend from the magnet body toward the vibration system; and the vibration system is stackedly provided at the magnet body, and surrounds the extending portion.

8. The multi-functional sound-generating device of claim 7, wherein the vibration system comprises a diaphragm fixed to the cone frame and a voice coil configured to drive the diaphragm to vibrate to produce sound; and the voice coil is inserted in the magnetic gap; and
- the diaphragm comprises a first surround in a ring shape, a second surround fixed to an inner periphery of the first surround, a third surround in a ring shape and a vibration portion in a ring shape; the third surround is spacedly provided at an inner side of the second surround; the vibration portion is fixedly connected between the second surround and the third surround; an outer periphery of the first surround is fixed to the enclosure; a side of the inner periphery of the first surround close to the magnetic circuit system is fixed to the cone frame; the voice coil is fixed to a side of the vibration portion close to the magnetic circuit system; and an inner periphery of the third surround is sleevedly provided on the extending portion.

9. The multi-functional sound-generating device of claim 8, wherein the vibration system further comprises a fixed ring fixed to the inner periphery of the third surround, and a dome; the dome is stackedly fixed to a side of the vibration portion away from the magnetic circuit system; and the fixed ring is configured to spacedly surround the extending portion.

10. The multi-functional sound-generating device of claim 9, wherein the vibration system further comprises a skeleton; the skeleton comprises a skeleton body configured to play a role as the vibration portion, a first skeleton connecting portion and a second skeleton connecting portion; the first skeleton connecting portion and the second skeleton connecting portion are configure to extend from a side of the skeleton body close to the magnetic circuit system, and are spaced from each other; the voice coil is fixed to a side of the first skeleton connecting portion close to the magnetic circuit system; and the dome is stackedly fixed to the skeleton body.

* * * * *